US011269399B1

(12) United States Patent
Chan et al.

(10) Patent No.: US 11,269,399 B1
(45) Date of Patent: Mar. 8, 2022

(54) FRONT CHIP FOR DATA TRANSMISSION SYSTEM

(71) Applicant: REALTEK SEMICONDUCTOR CORPORATION, Hsinchu (TW)

(72) Inventors: Chun-Chieh Chan, Hsinchu (TW); Heng-Yi Chen, Hsinchu (TW); Hsing-Yu Lin, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/134,058

(22) Filed: Dec. 24, 2020

(30) Foreign Application Priority Data

Sep. 29, 2020 (TW) .................................. 109133966

(51) Int. Cl.
*G06F 1/32* (2019.01)
*G06F 1/06* (2006.01)
*G06F 1/08* (2006.01)
*G06F 1/3296* (2019.01)
*G06F 1/3287* (2019.01)
*G06F 1/324* (2019.01)

(52) U.S. Cl.
CPC .............. *G06F 1/3296* (2013.01); *G06F 1/06* (2013.01); *G06F 1/08* (2013.01); *G06F 1/324* (2013.01); *G06F 1/3287* (2013.01)

(58) Field of Classification Search
CPC ...... G06F 1/3296; G06F 1/324; G06F 1/3287; G06F 1/06; G06F 1/08
See application file for complete search history.

(56) References Cited

U.S. PATENT DOCUMENTS

| | | | | |
|---|---|---|---|---|
| 2008/0282100 | A1* | 11/2008 | Chen | ...................... G06F 9/4418 713/322 |
| 2012/0102346 | A1* | 4/2012 | Haj-Yihia | ............. G06F 1/3234 713/322 |
| 2015/0253842 | A1* | 9/2015 | Murata | .................. G06F 1/3287 713/323 |

* cited by examiner

*Primary Examiner* — Stefan Stoynov
(74) *Attorney, Agent, or Firm* — WPAT, P.C., Intellectual Property Attorneys; Anthony King (57) ABSTRACT

A chip includes a receiving, a transmission, a control, and a switch circuit. The receiving circuit is operated at a first voltage and receives a first data. The transmission circuit is operated at the first voltage. Under general mode, the control circuit is operated at a second voltage and generates a second data to the transmission circuit according to the first data. The control circuit includes a first clock source configured to provide a first clock under general mode. The control circuit is operated according to the first clock. Under general mode, the switch circuit is operated at the first voltage, and controls the second voltage to pause the second voltage supplying to the control circuit to enter sleep mode. Under sleep mode, the switch circuit controls the supply of the second voltage to the control circuit according to the first data to return to general mode.

19 Claims, 4 Drawing Sheets

FRONT CHIP FOR DATA TRANSMISSION SYSTEM

CROSS-REFERENCE TO RELATED APPLICATIONS

This application claims the benefit of priority to Patent Application No. 109133966, filed in Taiwan on Sep. 29, 2020, which is incorporated by reference in its entirety.

TECHNICAL FIELD

The present application relates to a chip; in particular, to a chip that operates under a general mode or a sleep mode according to the received signals.

BACKGROUND

In current technologies, many input/output (I/O) devices use only one transmission protocol to communicate with each other due to cost considerations; therefore, additional front chips are generally used to apply transmission protocol conversions or expand the number of I/O ports depending on the application of the system. However, the application of a large number of front chips tends to increase the overall power consumption of the system, which has become an urgent issue to be solved in this field.

SUMMARY OF THE INVENTION

Some embodiments of the present disclosure provide a chip configured to reduce a power consumption of a data transmission system including an analog receiving circuit, an analog transmission circuit, a digital control circuit and a switch circuit. The analog receiving circuit is operated at a first reference voltage and configured to receive a first data signal. The analog transmission circuit is operated at the first reference voltage. When the chip is under a general mode, the digital control circuit is operated at a second reference voltage and is configured to generate a second data signal to the analog transmission circuit according to the first data signal. The digital control circuit includes a first clock source, and the first clock source is configured to provide a first clock signal under the general mode. The digital control circuit is operated according to the first clock signal. Under the general mode, the switch circuit is operated at the first reference voltage, and the switch circuit is configured to control the second reference voltage so as to pause a supply of the second reference voltage to the digital control circuit, so that the chip enters a sleep mode. Under the sleep mode, the switch circuit controls the supply of the second reference voltage to the digital control circuit according to the first data signal, so that the chip returns to the general mode. The first reference voltage is higher than the second reference voltage.

Some embodiments of the present disclosure provide a chip configured to reduce a power consumption of a data transmission system including a digital control circuit and a switch circuit. When the chip is under a general mode, the digital control circuit operating at first reference voltage. The digital control circuit includes a first clock source, and the first clock source configured to generate first pulse signal. The digital control circuit is configured to operate according to the first clock signal. The switch circuit is operated at a second reference voltage. When the chip is under the general mode, the switch circuit is configured to control the first reference voltage so as to stop the supply of the first reference voltage to the digital control circuit, so that the chip enters a sleep mode. When the chip is under the sleep mode, the switch circuit controls the supply of the first reference voltage to the digital control circuit according to a hot swapping signal, so that the chip returns to the general mode. The second reference voltage is higher than the first reference voltage, and the hot swapping signal is generated by connecting the chip with an electronic device.

The chips according to the present application can reduce the overall power consumption under a sleep mode, while still maintain the function of waking the chip from the sleep mode to the general mode.

BRIEF DESCRIPTION OF THE DRAWINGS

Aspects of the present disclosure are best understood from the following detailed description when read with the accompanying drawings. It is noted that, in accordance with the standard practice in the industry, various features are not drawn to scale. In fact, the dimensions of some features may be arbitrarily increased or reduced for clarity of discussion.

DETAILED DESCRIPTION

Figure 1:
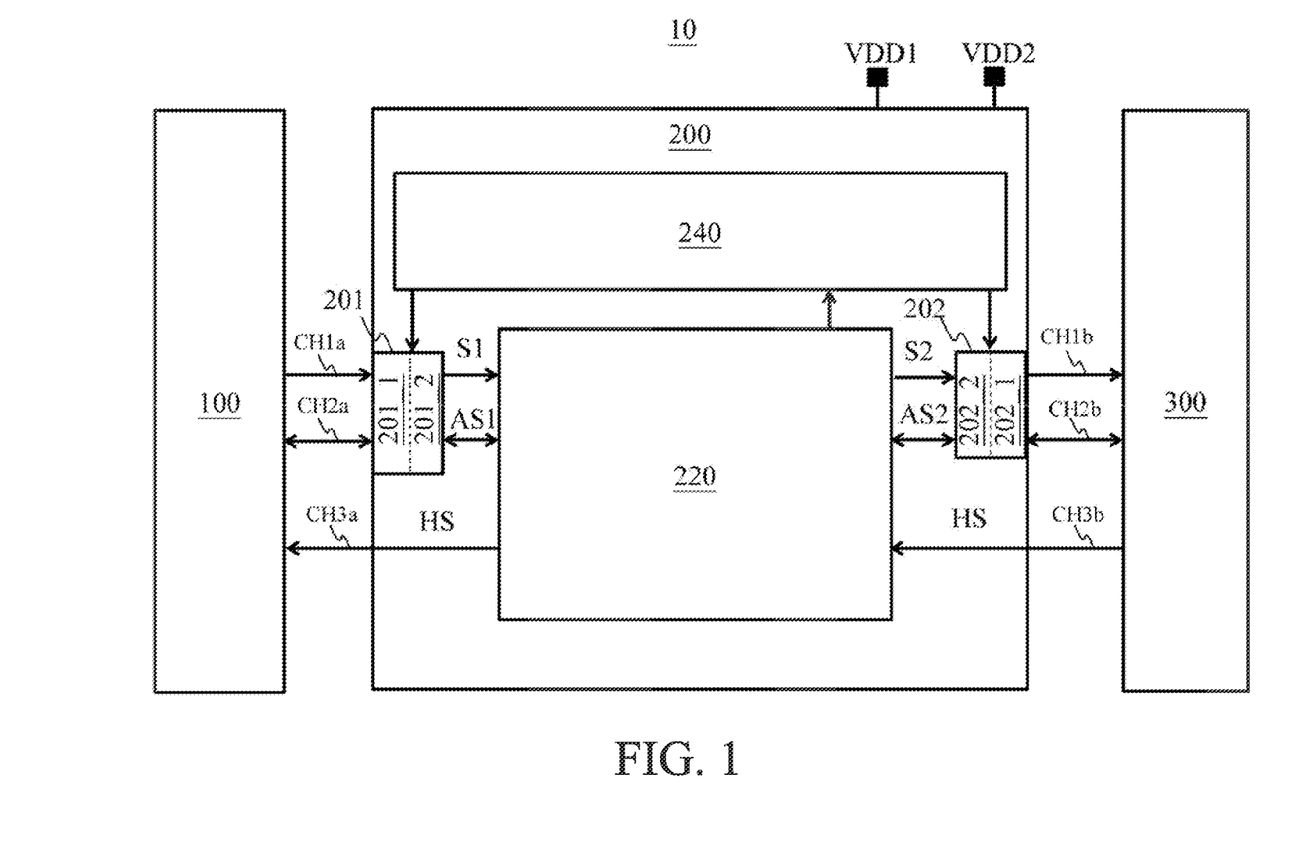
FIG. 1 is a schematic diagram illustrating a data transmission system according to some embodiments.

Reference is made to FIG. 1. In the present data transmission system 10, a front chip 200 can be switched between a general mode and a sleep mode; when the front chip 200 is idle, it can be switched to the sleep mode to reduce the power consumption. The operation will be described in detail below.

The data transmission system 10 includes a transmission device 100, the front chip 200, and a receiving device 300. The front chip 200 is coupled between the transmission device 100 and the receiving device 300. When the receiving device 300 uses a transmission protocol different from the transmission protocol used by the transmission device 100, the front chip 200 is configured to convert the format of the signal so that the receiving device 300 can receive the signal from the transmission device 100.

In the present embodiment, interfaces are disposed between the front chip 200 and the transmission device 100 or the front chip 200 and the receiving device 300, wherein the interfaces are configured to transmit high-speed signals and low-speed signals. As shown in FIG. 1, the high-speed signals include the data signal S1 transmitted via the channel CH1a between the transmission device 100 and the front chip 200 as well as the data signal S2 transmitted via the channel CH1b between the receiving device 300 and the front chip 200. The low-speed signals include auxiliary signal AS1 transmitted via the channel CH2a between the transmission device 100 and the front chip 200 as well as the auxiliary signal AS2 transmitted via the channel CH2b between the receiving device 300 and the front chip 200. The low-speed signals further include the hot swapping signal HS generated when the receiving device 300 is connected to the chip 200. The hot swapping signal HS is transmitted via the channel CH3a and the channel CH3b.

For example, the transmission device 100 can be a personal computer only uses the High Definition Multimedia Interface (HDMI) transmission protocol, and the receiving device 300 can be a monitor only uses the DisplayPort (DP) transmission protocol. When the monitor is connected to the front chip 200, a hot swapping signal HS is generated and transmitted to the front chip 200. Next, the front chip 200 transmits the hot swapping signal HS to the personal computer to notify that the monitor has connected. The personal computer then transmits the HDMI data signal S1 carrying the content to be displayed to the front chip 200, and the front chip 200 converts the HDMI signal S1 into the data signal S2 of the DP transmission protocol and transmits the same to the monitor, so that the monitor can receive the data signal S2 and presents the content to be displayed.

In another example, the auxiliary signals (e.g., AS1, AS2) carry information including the transmission speed and other specifications of the high-speed signals (e.g., S1, S2) under a specific transmission protocol. Generally, devices (e.g., 100, 300) cannot determine the transmission protocol via the channel (i.e., CH2a, CH2b) for the auxiliary signal. In some embodiments, the monitor is connected to the computer via the front chip 200 and generates the hot swapping signal HS to the computer, the computer and the monitor auxiliary signal adjust the high-speed signal (e.g., determining the transmission speed or the number of the transmission channel), the computer sends the high-speed signal (including content to be displayed) to the monitor via the high-speed channel. In some embodiments, the auxiliary signal AS1 and the auxiliary signal AS2 are also referred to as sideband signals.

The front chip 200 includes an analog receiving circuit 201, an analog transmission circuit 202, a digital control circuit 220, and a switch circuit 240. The analog receiving circuit 201 is configured to transmits the data signal S1 and the auxiliary signal AS1, and the analog transmission circuit 202 is configured to transmits the data signal S2 and the auxiliary signal AS2, wherein the analog receiving circuit 201 and analog transmission circuit 202 belong to the physical layer of the front chip 200. The digital control circuit 220 is coupled between the analog receiving circuit 201 and the analog transmission circuit 202 and configured to convert the data signal S1 into the data signal S2, as well as convert the auxiliary signal AS1 into the auxiliary signal AS2 or convert the auxiliary signal AS2 into the auxiliary signal AS1. The digital control circuit 220 is further configured to receive the hot swapping signal HS directly. In other words, the hot swapping signal HS is not transmitted via the analog receiving circuit 201 and the analog transmission circuit 202.

The switch circuit 240 is coupled to and configured to control the analog receiving circuit 201, the analog transmission circuit 202 and the digital control circuit 220, so that they are operated under the general mode or sleep mode. In the general mode, the data signal S1 is transmitted to the front chip 200, and the functions and power supply of the analog receiving circuit 201, the analog transmission circuit 202 and the digital control circuit 220 are fully turned on to convert the data signal S1 and generate the data signal S2. When there is no signal being transmitted into the front chip 200 (i.e., when it is idle), the switch circuit 240 controls the analog receiving circuit 201, the analog transmission circuit 202 and the digital control circuit 220 to enter the sleep mode, so that the power supply of the digital control circuit 220 is stopped. The switch circuit 240 determines whether to exit the sleep mode according to at least one of the data signal S1, the auxiliary signal AS1, the auxiliary signal AS2 and the hot swapping signal HS.

In the data transmission system 10, the front chip 200 is operated at a reference voltage VDD1 and a reference voltage VDD2, wherein the reference voltage VDD1 (in some embodiments, it is known as the core power with a voltage around 1.0V or 1.1V) is lower than the reference voltage VDD2 (in some embodiments, it is known as the pad power with a voltage around 3.3V). The digital control circuit 220, as a whole, is operated at the reference voltage VDD1, and the switch circuit 240 is operated at the reference voltage VDD2. In other words, when the supply of the reference voltage VDD1 to the digital control circuit 220 is stopped, the digital control circuit 220 is turned off completely. The analog receiving circuit 201 includes a first portion 201_1 and a second portion 201_2; the analog transmission circuit 202 includes a first portion 202_1 and a second portion 202_2. In this embodiment, the first portion 201_1 and the first portion 202_1 are operated at the reference voltage VDD2 (i.e., the pad power); the second portion 201_2 and the second portion 202_2 are operated at the reference voltage VDD1 (i.e., the core power). The reference voltage VDD2 is configured to provide electricity so that the first portion 201_1 receives the data signal S1 and the auxiliary signal AS1 from the transmission device 100, thereby allowing the first portion 202_1 to receive the auxiliary signal AS2 from the receiving device 300 or to transmit the data signal S2 and the auxiliary signal AS2 to the receiving device 300. The reference voltage VDD1 is configured to supply power so that the second portion 201_2 may transmit the data signal S1 and the auxiliary signal AS1 to the digital control circuit 220 or receive the auxiliary signal AS1 from the digital control circuit 220; the reference voltage VDD1 is configured to supply power so that the second portion 202_2 may receive the data signal S2 and the auxiliary signal AS2 from the control circuit 220 or to transmit the auxiliary signal AS2 to the digital control circuit 220. The switch circuit 240 is configured to control whether to supply the reference voltage VDD1 (i.e., the core power) to the digital control circuit 220 so as to switch between the general mode and the sleep mode. Details of the process are discussed below.

Figure 2:
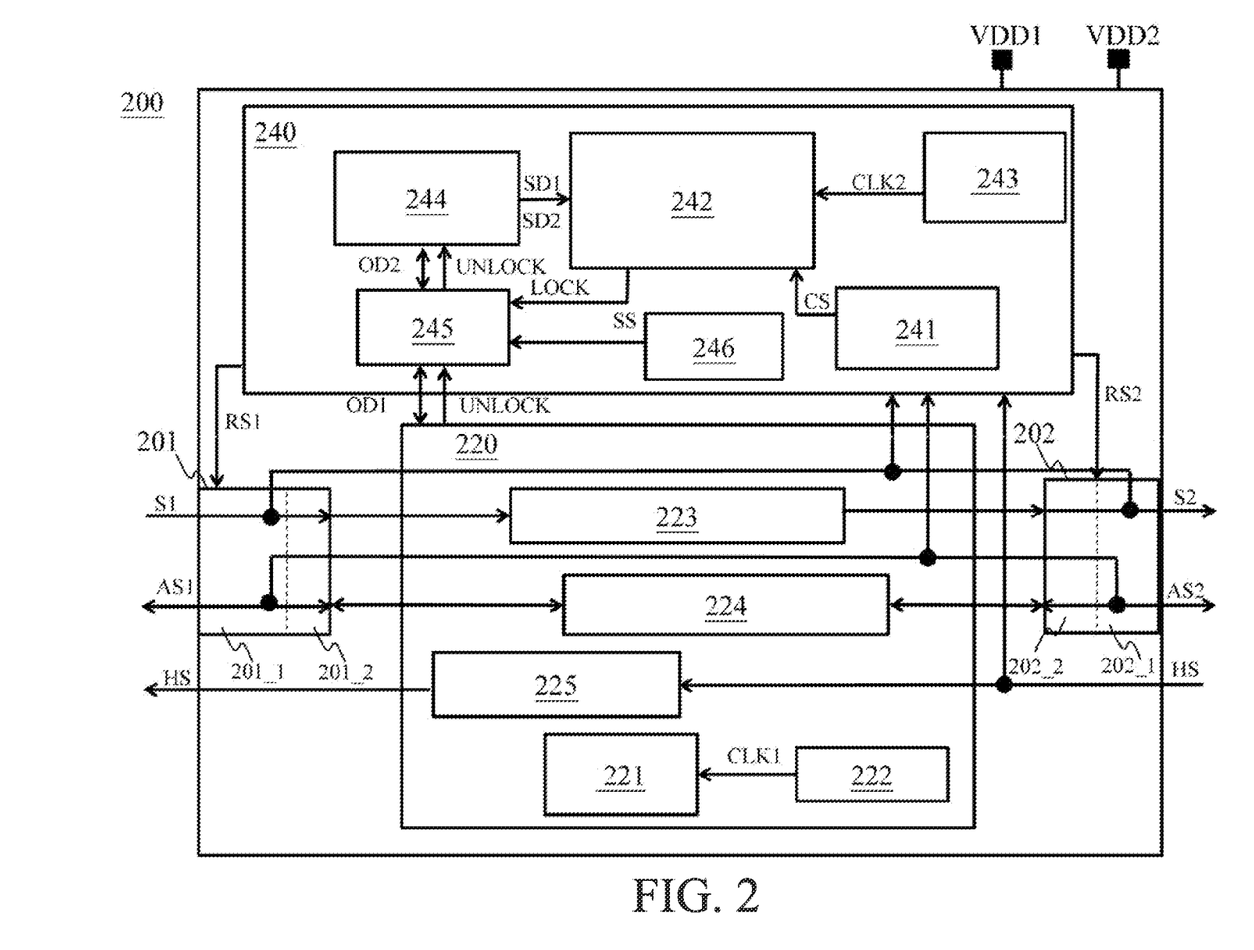
FIG. 2 is a schematic diagram illustrating a front chip used in the data transmission system according to some embodiments.

Reference is made to FIG. 2. The digital control circuit 220 in the front chip 200 includes a processing unit 221, a clock source 222, a signal converting unit 223, an auxiliary control unit 224, and a hot swapping detector 225, and the switch circuit 240 of the front chip 200 includes a signal detector 241, a processing unit 242, a clock source 243, a storage unit 244, a potential transducer 245, and a resetter 246.

Under the general mode, the clock source 222 generates a clock signal CLK1 and provides the same to the processing unit 221. The clock signal CLK1 is a high-speed clock signal, such as a high-speed clock signal having a frequency order of million hertz (MHz); however, the present embodiment is not limited thereto. The processing unit 221 controls the signal converting unit 223 (connection is not shown in the drawings) to converts the received data signal S1 into a data signal S2 according to the clock signal CLK1 and controls the auxiliary control unit 224 (connection is not shown in the drawings) to transmit the auxiliary signal AS1 and the auxiliary signal AS2. The processing unit 221 further controls the hot swapping detector 225 to receive and transmit a hot swapping signal HS.

Under the sleep mode, because the supply of the reference voltage VDD1 to the digital control circuit 220 is stopped, the clock source 222 stops generating the clock signal CLK1, so that the operation of the processing unit 221 is stopped. In some embodiments, the processing unit 221 and the clock source 222 are components having the highest power consumption in the front chip 200. Therefore, when the digital control circuit 220 is turned off completely, the power consumption of the front chip 200 may reduce significantly; e.g., from milliwatt (mW) level to microwatt (μW) level.

In the switch circuit 240, the processing unit 242 is coupled to the signal detector 241, the clock source 243, the storage unit 244, and the potential transducer 245, and the potential transducer 245 is further coupled to the resetter 246. In the present application, under the general mode and sleep mode, the reference voltage VDD2 is supplied to the front chip 200 continuously; therefore, the switch circuit 240 of the front chip 200 would not stop operating as a result of being switched to the sleep mode.

The clock source 243 generates the clock signal CLK2 and transmits the same to the processing unit 242. The clock signal CLK2 is a low-speed clock signal, such as, a low-speed clock signal having a frequency order of kilohertz (KHz); however, the present embodiment is not limited thereto. In other words, the frequency of the clock signal CLK2 is lower than the frequency of the clock signal CLK1. Generally, the power consumption for generating clock signals with higher frequencies is greater. Therefore, the power consumption for generating the clock source 243 is lower than the power consumption for generating the clock source 222.

Under the general mode, the processing unit 242 controls the potential transducer 245 according to the clock signal CLK2 with a lower speed, so that the potential transducer 245 converts the operation information OD1 (which is from the digital control circuit 220) from a voltage domain of the reference voltage VDD1 into a voltage domain of the reference voltage VDD2. The converted operation information OD2 is stored in the storage unit 244. Because the digital control circuit 220 continues to operate under the general mode, the potential transducer 245 continues to convert the operation information OD1 and updates the operation information OD2 stored in the storage unit 244. In some embodiments, the storage unit 244 can be implemented using a register latch; however, the present embodiment is not limited thereto.

When the front chip 200 is switched from the general mode to the sleep mode, the digital control circuit 220 notifies the processing unit 242 of the switch circuit 240 for mode switching. More specifically, the digital control circuit 220 may transmit the operation information OD1 carrying the sleep information SD1 to the potential transducer 245, and then the potential transducer 245 converts the operation information OD1 into the operation information OD2 (which has the same content and operation information as the OD1) and stores the same in the storage unit 244. In this way, the processing unit 242 can perform the operation of switching from the general mode to the sleep mode according to the sleep information SD1 in the storage unit 244, wherein the sleep information SD1 is included in the operation information OD2. In some embodiments, it could be implemented by a lock signal LOCK and an unlock signal UNLOCK.

In some embodiments, the digital control circuit 220 and the potential transducer 245 are connected by at least two channels, wherein the first channel is configured to transmit the information including the unlock signal UNLOCK, and the second channel is configured to transmit other information in the operation information OD1 other than the unlock signal UNLOCK; however, the present embodiment is not limited thereto. After the processing unit 242 (via the storage unit 244) access the sleep information SD1, the processing unit 242 can transmit the lock signal LOCK to the potential transducer 245, so that the potential transducer 245 turns off the second channel, and the potential transducer 245 will no longer receive any information other than the unlock signal UNLOCK, so that except for the unlock signal UNLOCK, other information in the operation information OD2 will no longer be updated. This action is designed to prevent the potential transducer 245 from receiving unknown signals from block circuits corresponding to the reference voltage VDD1 after the reference voltage VDD1 is turned off.

Subsequently, the processing unit 242 generates a reset signal RS1 and a reset signal RS2 that are transmitted to the analog receiving circuit 201 and the analog transmission circuit 202, respectively. After the analog receiving circuit 201 and the analog transmission circuit 202 respectively receives the reset signal RS1 and the reset signal RS2, the analog receiving circuit 201 turns off the function of the second portion 201_2, and the analog transmission circuit 202 turns off the function of the second portion 202_2.

Thereafter, the processing unit 242 controls the reference voltage VDD1 to stop the power supply to the front chip 200, so as to control, among others, the voltage regulator on the printed circuit board (PCB), the power switch on the PCB, or the power switch reference voltage VDD1 (i.e., the core power) inside the front chip 200, so that the digital control circuit 220, the second portion 201_2 of the analog receiving circuit 201, and the second portion 202_2 of the analog transmission circuit 202 are turned off.

It is noted that the resetter 246 may generate status signal SS to the potential transducer 245 in response to the power supply status of the reference voltage VDD1 (i.e., the core power). In some embodiments, when the reference voltage VDD1 is not supplied to the digital control circuit 220, the resetter 246 generates a status signal SS having a first value to the potential transducer 245, so that potential transducer 245 turns off the second channel connected to the digital control circuit 220 according to the status signal SS, so that the potential transducer 245 does not receive all information (including the unlock signal UNLOCK). In this way, operation information OD2 in the storage unit 244 maintains, and the front chip 200 enters the sleep mode accordingly.

Under the sleep mode, since the supply of the reference voltage VDD1 to the front chip 200 is stopped, the digital control circuit 220 is turned off, but the first portion 201_1 of the analog receiving circuit 201 operated at the reference voltage VDD2 can still receive the data signal S1 and the auxiliary signal AS1, and the first portion 202_1 of the analog transmission circuit 202 operated at the reference voltage VDD2 can still receive the auxiliary signal AS2. The signal detector 241 may detect any of the foregoing signals. Moreover, in some embodiments, the signal detector 241 can further receive the hot swapping signal HS directly without using the analog transmission circuit 202. In some embodiments, the above-mentioned data signal S1, auxiliary signal AS1, auxiliary signal AS2, and hot swapping signal HS are referred to as the "wake-up conditions." Therefore, under the sleep mode, the signal detector 241 can generate the control signal CS to the processing unit 242 according to the wake-up condition (e.g., when the voltage of any of the foregoing signals changes), so as to perform the operation of exiting the sleep mode.

The present front chip 200, when under the sleep mode, can completely cutoff the supply of the reference voltage VDD1 to reduce the power consumption of the front chip 200 (e.g., reducing to the power consumption of microampere (uA) level) and can maintain the capability of waking the front chip 200 to return to the general mode. The procedure for the front chip 200 to return to the general mode from the sleep mode is discussed below.

When switching the front chip 200 from the sleep mode to the general mode, the processing unit 242 updates the sleep information SD1 stored in the storage unit 244 into the wake-up information SD2 in response to the control signal CS of the signal detector 241. According to the wake-up information SD2 in the storage unit 244, the processing unit 242 can resume the supply of the reference voltage VDD1 (i.e., the core power) to the front chip 200 (e.g., by controlling the voltage regulator on the printed circuit board, power switch, or the power switch in the front chip). In response to the resumed supply of the reference voltage VDD1, the resetter 246 generates a status signal SS having a second value to the potential transducer 245, and the potential transducer 245 clears the blocked status of the unlock signal UNLOCK according to the status signal SS having the second value. Next, after the power supply of the reference voltage VDD1 is resumed, the digital control circuit 220 transmits the unlock signal UNLOCK to the potential transducer 245 and the unlock signal UNLOCK is transmitted from the potential transducer 245 to the storage unit 244. After the storage unit 244 receives the unlock signal UNLOCK, the processing unit 242 determines that the storage unit 244 has successfully received the unlock signal UNLOCK and controls the potential transducer 245 to convert the operation information OD2 stored in the storage unit 244 from the voltage domain of the reference voltage VDD2 to the voltage domain of the reference voltage VDD1, and then outputs the same as the operation information OD1 to the digital control circuit 220. The digital control circuit 220 returns to the operation status (i.e., the mode before it enters the sleep mode) according to the operation information OD1, so that the front chip 200 returns to the general mode. It is noted that since the digital control circuit 220 receives the operation information OD1 until the operating power is resumed after the reference voltage VDD1 (i.e., the core power) is supplied, there will be no floating (i.e., the operation information OD1 being sent to the digital control circuit 220 when there is no power supply).

When switching from the sleep mode to the general mode, the processing unit 242 stops transmitting the reset signal RS1 and the reset signal RS2 until the supply of the reference voltage VDD1 to the front chip 200 is resumed, so that the analog receiving circuit 201 and the analog transmission circuit 202 regain the functions of the second portion 201_2 and the second portion 202_2. Because the analog receiving circuit 201 and the analog transmission circuit 202 is enabled after it receives the supply of the reference voltage VDD1, there will be no floating (i.e., the analog receiving circuit 201 and the analog transmission circuit 202 is enabled but there is no power supply).

The arrangements of the above-mentioned data transmission system 10 are provided for the purpose of illustration. Various arrangements of different data transmission system 10 are within the consideration and scope of the present application. For example, reference is made to the data transmission system 30 and the data transmission system 40 shown in FIG. 3 and FIG. 4.

Figure 3:
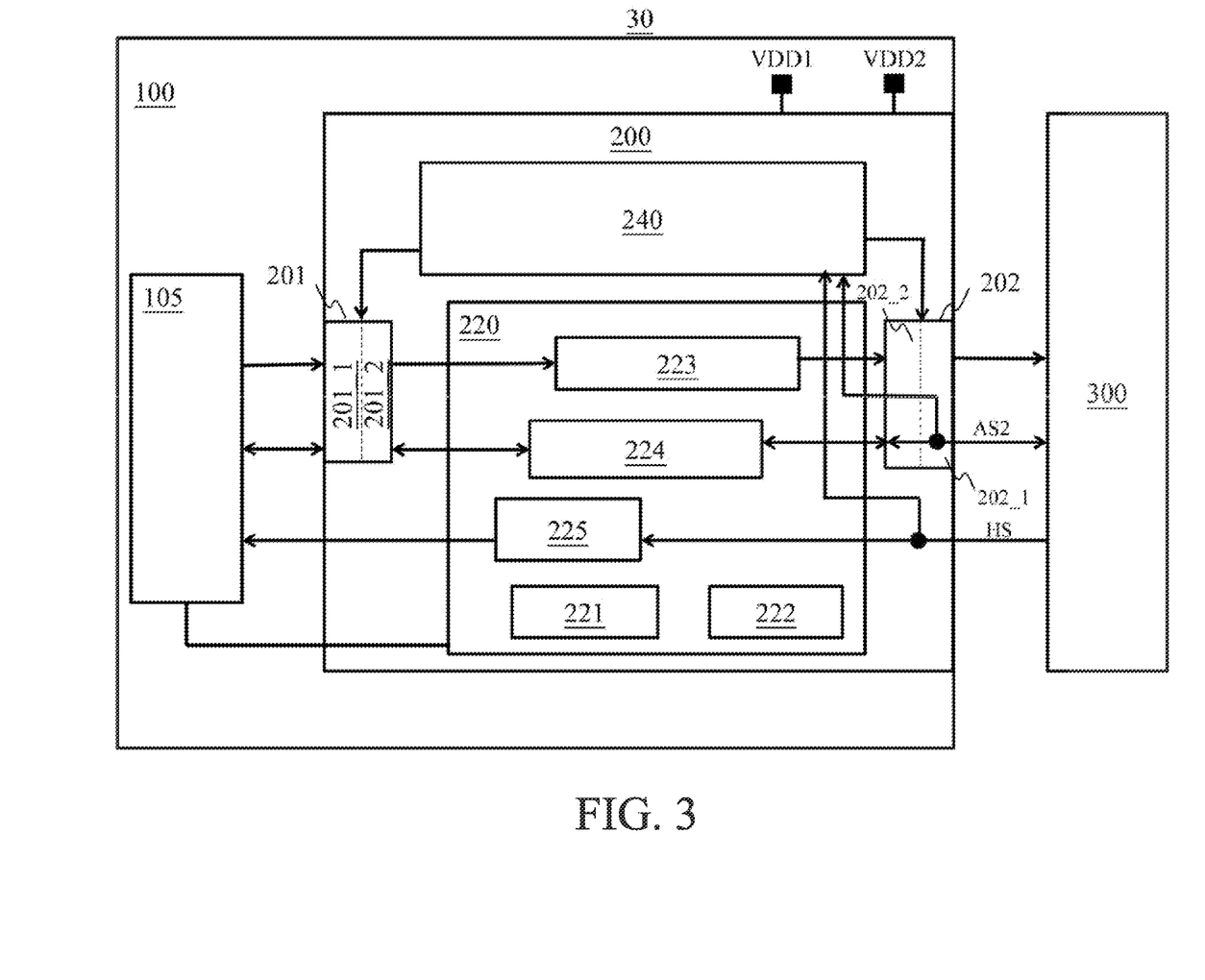
FIG. 3 is a schematic diagram illustrating a data transmission system according to other embodiments.

In some embodiments, as shown in the data transmission system 30 of FIG. 3, the front chip 200 is contained in the transmission device 100, wherein it is coupled to the processor 105 of the transmission device 100 and controlled by the processor 105. Because the processor 105 can detect whether the transmission device 100 is going to transmit the data signal S1 or the auxiliary signal AS1, the processor 105 can notify the front chip 200 about the operation status directly. When the transmission device 100 does not need to transmit the data signal S1, the processor 105 can control the front chip 200 to enter the sleep mode. Under the sleep mode, when the transmission device 100 is ready to transmit the data signal S1, the processor 105 can control the front chip 200 to return to the general mode. That is, the front chip 200 does not need to detect the data signal S1 and the auxiliary device AS1 from the transmission device 100.

In some embodiments, when the receiving device 300 has not connected to the front chip 200 of the transmission device 100 yet, the front chip 200 is under the sleep mode. In this case, the front chip 200 determines whether the receiving device 300 is connected thereto according to the hot swapping signal HS. When the front chip 200 detects the transmission of the hot swapping signal HS, it means that the receiving device 300 is already connected thereto, and hence, the front chip 200 returns to the general mode for the transmission of the data signal S1.

In some other embodiments, when the receiving device 300 has connected to the front chip 200 in the transmission device 100 already, but the receiving device 300 is turned off and unable to receive the data signal S2, the front chip 200 is under the sleep mode because it does not need to convert the data signal S1 into the data signal S2. In this case, the front chip 200 determines whether the receiving device 300 is ready to receive the data signal S2 according to the auxiliary signal AS2. When the front chip 200 detects the transmission of the auxiliary signal AS2 from the receiving device 300 (after it is turned on), it means that the receiving device 300 is ready to receive the data signal S2, so that the front chip 200 returns to the general mode. The processor 105 is ready for the transmission of the data signal S1.

Figure 4:
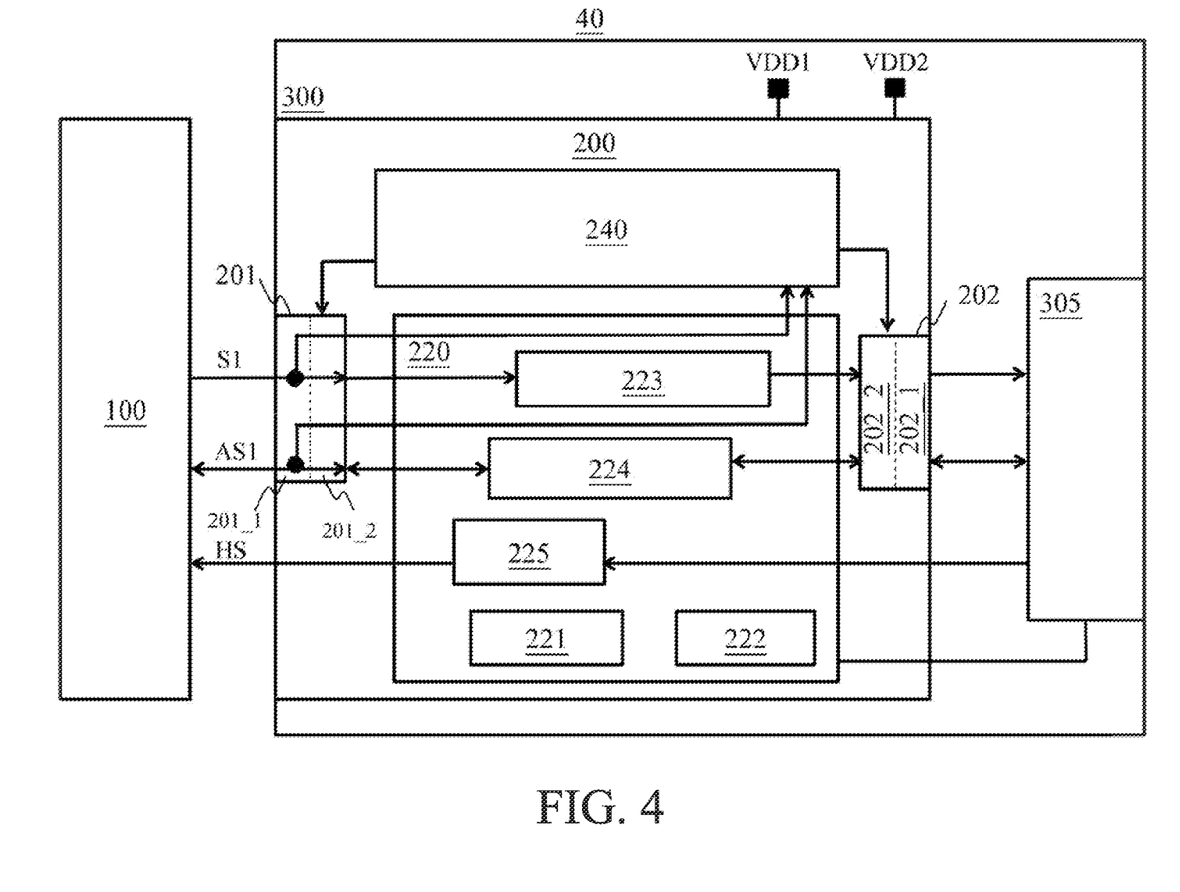
FIG. 4 is a schematic diagram illustrating a data transmission system according to other embodiments.

In some embodiments, as shown in the data transmission system 40 of FIG. 4, the front chip 200 is contained in the receiving device 300, wherein it is coupled to the processor 305 of the receiving device 300 and controlled by the processor 305. Because the processor 305 can detect whether the transmission device 300 is going to transmit the auxiliary signal AS1, the processor 305 can notify the front chip 200 about the operation status directly. The front chip 200 can receive the hot swapping signal HS from the receiving device 300, but it only transmits the hot swapping signal HS to the transmission device 100 when the transmission device 100 is connected, whereas the auxiliary signal is only generated after the transmission device 100 is connected. Therefore, the front chip 200 under the sleep mode only needs to detect the data signal S1 and the auxiliary signal AS1 from the transmission device 100 to determine whether the front chip 200 returns to the general mode.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A chip, configured to reduce a power consumption of a data transmission system, comprising:
   an analog receiving circuit, operated at a first reference voltage and configured to receive a first data signal;
   an analog transmission circuit, operated at the first reference voltage;
   a digital control circuit, wherein when the chip is under a general mode, the digital control circuit is operated at a second reference voltage and is configured to generate a second data signal to the analog transmission circuit according to the first data signal, wherein the digital control circuit includes a first clock source, and the first clock source is configured to provide a first clock signal under the general mode, wherein the digital control circuit is operated according to the first clock signal; and
   a switch circuit, wherein under the general mode, the switch circuit is operated at the first reference voltage, and the switch circuit is configured to control the second reference voltage so as to stop a supply of the second reference voltage to the digital control circuit, so that the chip enters a sleep mode, wherein under the sleep mode, the switch circuit controls the supply of the second reference voltage to the digital control circuit according to the first data signal, so that the chip returns to the general mode, wherein the first reference voltage is higher than the second reference voltage.

2. The chip of claim 1, wherein the switch circuit comprises:
   a signal detector, configured to detect the first data signal and generate a control signal when the chip is under the sleep mode;
   a storage unit, configured to store operation information of the digital control circuit;
   a second clock source, configured to provide a second clock signal; and
   a processing unit, configured to, when the chip is under the sleep mode, allow the second reference voltage to be supplied to the digital control circuit according to the second clock signal and the control signal, so that the chip returns to the general mode; and when the chip is under the general mode, disallow the second reference voltage to be supplied to the digital control circuit according to the second clock signal and the operation information, so that the chip enters the sleep mode.

3. The chip of claim 2, wherein a frequency of the first clock signal is higher than a frequency of the second clock signal.

4. The chip of claim 2, wherein the switch circuit further comprises:
   a potential transducer, configured to convert the operation information of the digital control circuit from the second reference voltage to the first reference voltage and store the first reference voltage to the storage unit,
   wherein when the chip is under the sleep mode, the processing unit is further configured to control the potential transducer according to the operation information, so that the potential transducer maintains the operation information stored in the storage unit.

5. The chip of claim 4, wherein when the chip switches form the sleep mode to the general mode, the processing unit is further configured to control the potential transducer to convert the operation information from the first reference voltage to the second reference voltage so as to transmit the second reference voltage to the digital control circuit.

6. The chip of claim 4, wherein the switch circuit further comprises:
   a resetter, wherein when the supply of the second reference voltage to the digital control circuit is stopped, the resetter generates a status signal to the potential transducer, wherein the status signal has a first value, wherein the potential transducer receives the status signal having the first value and transmits first information of the operation information stored in the storage unit to the processing unit, wherein the first information is configured to allow the processing unit to control the potential transducer, so that the potential transducer maintains the operation information stored in the storage unit.

7. The chip of claim 6, wherein when the supply of the second reference voltage to the digital control circuit resumes from being stopped, the resetter generates the status signal to the potential transducer, wherein the status signal has a second value, wherein the potential transducer receives the status signal having the second value and transmits second information of the operation information stored in the storage unit to the processing unit, wherein the second information is configured to allow the processing unit to control the potential transducer, so that the potential transducer stops maintaining the operation information stored in the storage unit.

8. The chip of claim 2, wherein the analog receiving circuit further operates at the second reference voltage, and is configured to transmit the first data signal to the digital control circuit, and the analog transmission circuit further operates at the second reference voltage to receive the second data signal,
   wherein before the chip enters the sleep mode, the processing unit is further configured to generate a first reset signal to the analog receiving circuit, and generate a second reset signal to the analog transmission circuit, wherein the first reset signal is configured to keep the analog receiving circuit from transmitting the first data signal to the digital control circuit, and the second reset signal is configured to keep the analog transmission circuit from receiving the second data signal from the digital control circuit.

9. The chip of claim 1, wherein the analog receiving circuit is further configured to receive an auxiliary signal, and when the chip is under the sleep mode, the switch circuit is further configured to control the second reference voltage to be supplied to the digital control circuit according to the auxiliary signal, so that the chip returns to the general mode.

10. The chip of claim 9, wherein the auxiliary signal includes information related to a type of the first data signal, and a transmission speed of the auxiliary signal is slower than a transmission speed of the first data signal.

11. A chip, configured to reduce a power consumption of a data transmission system, comprising:
   a digital control circuit, wherein when the chip is under a general mode, the digital control circuit operates at a first reference voltage, wherein the digital control circuit includes a first clock source, and the first clock source configured to generate a first clock signal, wherein the digital control circuit is configured to operate according to the first clock signal; and
   a switch circuit, operated at a second reference voltage, wherein when the chip is under the general mode, the switch circuit is configured to control the first reference voltage so as to stop the supply of the first reference voltage to the digital control circuit, so that the chip enters a sleep mode, and when the chip is under the sleep mode, the switch circuit controls the supply of the first reference voltage to the digital control circuit according to a hot swapping signal, so that the chip returns to the general mode, wherein the second reference voltage is higher than the first reference voltage, and the hot swapping signal is generated by connecting the chip with an electronic device, wherein the switch circuit comprising:
  a storage unit, configured to store operation information of the digital control circuit;
  a processing unit, configured to, when the chip is under the sleep mode, allow the first reference voltage to be supplied to the digital control circuit, so that the chip returns to the general mode, and when the chip is under the general mode, disallow the first reference voltage to be supplied to the digital control circuit according to the operation information, so that the chip enters the sleep mode; and
  a potential transducer, configured to convert the operation information of the digital control circuit from the first reference voltage to the second reference voltage and store the second reference voltage to the storage unit,
  wherein when the chip is under the sleep mode, the processing unit is further configured to control the potential transducer according to the operation information, so that the potential transducer maintains the operation information stored in the storage unit.

12. The chip of claim 11, wherein the switch circuit further comprising:
  a signal detector, configured to detect the hot swapping signal and generate a control signal when the chip is under the sleep mode; and
  a second clock source, configured to provide a second clock signal,
  wherein when the chip is under the sleep mode, the processing unit allows the first reference voltage to be supplied to the digital control circuit according to the second clock signal and the control signal, so that the chip returns to the general mode, and when the chip is under the general mode, the processing unit disallows the first reference voltage to be supplied to the digital control circuit according to the second clock signal and the operation information, so that the chip enters the sleep mode.

13. The chip of claim 12, wherein the frequency of the first clock signal is higher than a frequency of the second clock signal.

14. The chip of claim 11, wherein when the chip switches from the sleep mode to the general mode, the processing unit is further configured to control the potential transducer to convert the operation information from the second reference voltage to the first reference voltage so as to transmit the first reference voltage to the digital control circuit.

15. The chip of claim 11, wherein the switch circuit further comprising:
  a resetter, wherein when the supply of the first reference voltage to the digital control circuit is stopped, the resetter generates a status signal to the potential transducer, wherein the status signal has a first value, wherein the potential transducer receives the status signal having the first value and transmits a first information of the operation information stored in the storage unit to the processing unit, wherein the first information is configured to allow the processing unit to control the potential transducer, so that the potential transducer maintains the operation information stored in the storage unit.

16. The chip of claim 15, wherein when the supply of the first reference voltage to the digital control circuit resumes from being stopped, the resetter generates the status signal to the potential transducer, wherein the status signal has a second value, wherein the potential transducer receives the status signal having the second value and transmits a second information of the operation information stored in the storage unit to the processing unit, wherein the second information is configured to allow the processing unit to control the potential transducer, so that the potential transducer stops maintaining the operation information stored in the storage unit.

17. The chip of claim 11, further comprising:
  an analog transmission circuit, operated at the second reference voltage and configured to receive a first auxiliary signal,
  wherein, when the chip is under the sleep mode, the switch circuit is further configured to control the supply of the first reference voltage to the digital control circuit according to the first auxiliary signal, so that the chip returns to the general mode.

18. The chip of claim 17, further comprising:
  an analog receiving circuit, operated at the second reference voltage and configured to receive a first data signal, wherein when the chip is under the general mode, the analog receiving circuit is further operated at the first reference voltage and transmits the first data signal to the digital control circuit, wherein the digital control circuit generates a second data signal to the analog transmission circuit according to the first data signal,
  wherein when the chip is under the general mode, the analog transmission circuit is further operated at the first reference voltage and transmits the first auxiliary signal to the digital control circuit, wherein the digital control circuit generates a second auxiliary signal to the analog receiving circuit according to the first auxiliary signal.

19. The chip of claim 18, wherein a transmission speed of the first auxiliary signal is slower than a transmission speed of the first data signal.

* * * * *